US011640516B2

(12) United States Patent
Baughman et al.

(10) Patent No.: US 11,640,516 B2
(45) Date of Patent: May 2, 2023

(54) DEEP EVOLVED STRATEGIES WITH REINFORCEMENT

(71) Applicant: INTERNATIONAL BUSINESS MACHINES CORPORATION, Armonk, NY (US)

(72) Inventors: Aaron K. Baughman, Cary, NC (US); Gray Franklin Cannon, Miami, FL (US); Gary William Reiss, Buford, GA (US); Corey B. Shelton, Marietta, GA (US); Stephen C. Hammer, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 16/891,108

(22) Filed: Jun. 3, 2020

(65) Prior Publication Data

US 2021/0383204 A1     Dec. 9, 2021

(51) Int. Cl.
| | |
|---|---|
| *G06N 3/006* | (2023.01) |
| *G06N 3/08* | (2023.01) |
| *G06N 20/00* | (2019.01) |
| *G06F 18/211* | (2023.01) |
| *G06F 18/25* | (2023.01) |

(52) U.S. Cl.
CPC .......... *G06N 3/006* (2013.01); *G06F 18/211* (2023.01); *G06F 18/251* (2023.01); *G06N 3/08* (2013.01); *G06N 20/00* (2019.01)

(58) Field of Classification Search
CPC ...... G06N 3/0454; G06N 20/00; G06N 7/005; G06N 3/006; G06N 3/02; G06N 3/0427; G06N 3/088; G06N 3/08; G06N 3/126; G06N 20/20; G06K 9/6267; G06K 9/6228; G06K 9/6289; G06K 9/6253
See application file for complete search history.

(56) References Cited

U.S. PATENT DOCUMENTS

| | | | |
|---|---|---|---|
| 9,770,658 B2 | 9/2017 | Bentley | |
| 11,276,127 B1 * | 3/2022 | Stevens | .................... G06N 3/08 |
| 11,347,803 B2 * | 5/2022 | Prabhugaonkar | .......................... G06F 16/24522 |
| 2006/0247973 A1 * | 11/2006 | Mueller | ................. G06Q 20/20 705/26.1 |

(Continued)

FOREIGN PATENT DOCUMENTS

| | | |
|---|---|---|
| CN | 105931226 A | 9/2016 |
| CN | 106779072 A | 5/2017 |

(Continued)

OTHER PUBLICATIONS

Online Network Revenue Management using Thompson Sampling—2018 (Year: 2018).*

(Continued)

*Primary Examiner* — Nizar N Sivji
(74) *Attorney, Agent, or Firm* — L. Jeffrey Kelly

(57) ABSTRACT

According to a first aspect of the present invention, there is provided a computer implemented method, a computer system and a computer program product, including training a set of exploitation models, training a set of exploration models, generating a combined exploitation and exploration heat map, and inputting the combined exploitation and exploration heat map into a convoluted neural network.

20 Claims, 8 Drawing Sheets

(56) References Cited

U.S. PATENT DOCUMENTS

| | | | | |
|---|---|---|---|---|
| 2010/0174671 | A1* | 7/2010 | Brooks | G06Q 30/02 |
| | | | | 706/12 |
| 2015/0248917 | A1* | 9/2015 | Chang | H04N 21/8549 |
| | | | | 386/282 |
| 2016/0012106 | A1* | 1/2016 | Franceschini | G06F 16/3344 |
| | | | | 707/728 |
| 2016/0012126 | A1* | 1/2016 | Franceschini | G06F 16/325 |
| | | | | 707/735 |
| 2017/0335662 | A1* | 11/2017 | Torrado | E21B 41/00 |
| 2019/0057311 | A1 | 2/2019 | Newell | |
| 2019/0324822 | A1* | 10/2019 | Gottin | G06N 3/08 |
| 2019/0325304 | A1* | 10/2019 | Gottin | G06F 9/5027 |
| 2019/0392710 | A1* | 12/2019 | Kapoor | G08G 1/147 |
| 2020/0065672 | A1* | 2/2020 | Osband | G06N 3/08 |
| 2020/0107198 | A1* | 4/2020 | Watkins | H04W 12/122 |
| 2020/0410356 | A1* | 12/2020 | Kuo | G06N 3/082 |
| 2021/0042609 | A1* | 2/2021 | Owoyele | G06F 7/582 |
| 2021/0150316 | A1* | 5/2021 | Riemenschneider | |
| | | | | G06N 3/0481 |
| 2021/0170594 | A1* | 6/2021 | Kuo | G06N 3/08 |
| 2021/0191384 | A1* | 6/2021 | Trenchard | G06V 10/82 |
| 2021/0311786 | A1* | 10/2021 | Tzortzatos | G06N 20/00 |
| 2021/0383204 | A1* | 12/2021 | Baughman | G06N 3/126 |
| 2022/0044454 | A1* | 2/2022 | Gao | G06K 9/6263 |
| 2022/0101185 | A1* | 3/2022 | Asif | G06K 9/6259 |

FOREIGN PATENT DOCUMENTS

| | | | | |
|---|---|---|---|---|
| CN | 111310985 B | * | 4/2022 | G06N 3/006 |
| WO | 2017177128 A1 | | 10/2017 | |
| WO | WO-2022086966 A1 | * | 4/2022 | |

OTHER PUBLICATIONS

Representation Learning: A Review and New Perspectives—2014 (Year: 2014).*

The Technological Elements of Artificial Intelligence—2017 (Year: 2017).*

Disclosed Anonymously, "Fan Engagement Tiered Keys to the Match for Optimal Play and Fan Experience", An IP.com Prior Art Database Technical Disclosure, IP.com No. IPCOM000253333D, IP.com Electronic Publication Date: Mar. 22, 2018, 5 pages.

Disclosed Anonymously, "Predictive Analytics System for Sporting Event Play Outcome Determination and Display", An IP.com Prior Art Database Technical Disclosure, IP.com No. IPCOM000216689D, IP.com Electronic Publication Date: Apr. 13, 2012, 5 pages.

Gollub, "Producing Win Probabilities for Professional Tennis Matches From Any Score", Digital Access to Scholarship at Harvard, Harvard Library Office for Scholarly Communication, 2017, 50 pages.

Holman, "Sports Analytics From A to Z, Methods, Definitions & Real-Life Applications", Agile Sports Ananlytics, Published Mar. 21, 2019, 310 pages.

ip.com, "Method to Predict a Gaming Hit Rate", An IP.com Prior Art Database Technical Disclosure, Original Publication Date: Feb. 23, 2009, IP.com No. IPCOM000179709D, IP.com Electronic Publication Date: Feb. 23, 2009, 3 pages.

Jang et al., "Q-Learning Algorithms: A Comprehensive Classification and Applications", IEEE Access, Received Aug. 13, 2019, accepted Sep. 9, 2019, date od publication Sep. 13, 2019, date of current version Sep. 27, 2019, pp. 133653-133667.

Jaritz et al., "End-to-End Race Driving with Deep Reinforcement Learning", 2018 IEEE International Conference on Robotics and Automation (ICRA), May 21-25, 2018, Brisbane, Australia, pp. 2070-2075.

Koutnik et al., "Evolving Deep Unsupervised Convolutional Networks for Vision-Based Reinforcement Learning", GECCO'14, Jul. 12-16, 2014, Vancouver, BC, Canada, Copyright 2014 ACM, pp. 541-548.

Loukianov et al., "Markov Modeling of a Tennis Point Played", ISSN 1750-9823 (print), International Journal of Sports Science and Engineering, 2007, Academic World Academic Union, pp. 1-12.

Sharma et al., "Deep Reinforcement Learning Based Parameter Control in Differential Evolution", GECCO '19, Jul. 13-17, 2019, Prague, Czech Republic, © 2019 Association for Computing Machinery, ACM, pp. 709-717.

Solozabal et al., "Virtual Network Function Placement Optimization With Deep Reinforcement Learning", IEEE Journal on Selected Areas in Communications, vol. 38, No. 2, Feb. 2020, pp. 292-303.

Zhou et al., "Competitive Evolution Multi-Agent Deep Reinforcement Learning", CSAE 2019, Oct. 22-24, 2019, Sanya, China, © 2019 Association for Computing Machinery. ACM, 6 pages.

Mell et al., "The NIST Definition of Cloud Computing", Recommendations of the National Institute of Standards and Technology, Special Publication 800-145, Sep. 2011, 7 pages.

* cited by examiner

DEEP EVOLVED STRATEGIES WITH REINFORCEMENT

BACKGROUND

The present invention relates to a computer implemented method, data processing system and computer program product for machine learning.

Decision making and learning require a strategy for myriad situations such as navigation, shopping, and games. A best strategy for a situation takes into consideration goals and values, which may change over time. Machine learning techniques may assist in determining a best strategy.

SUMMARY

According to a first aspect of the present invention, there is provided a computer implemented method, a computer system and a computer program product, including training a set of exploitation models, training a set of exploration models, generating a combined exploitation and exploration heat map, and inputting the combined exploitation and exploration heat map into a convoluted neural network.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
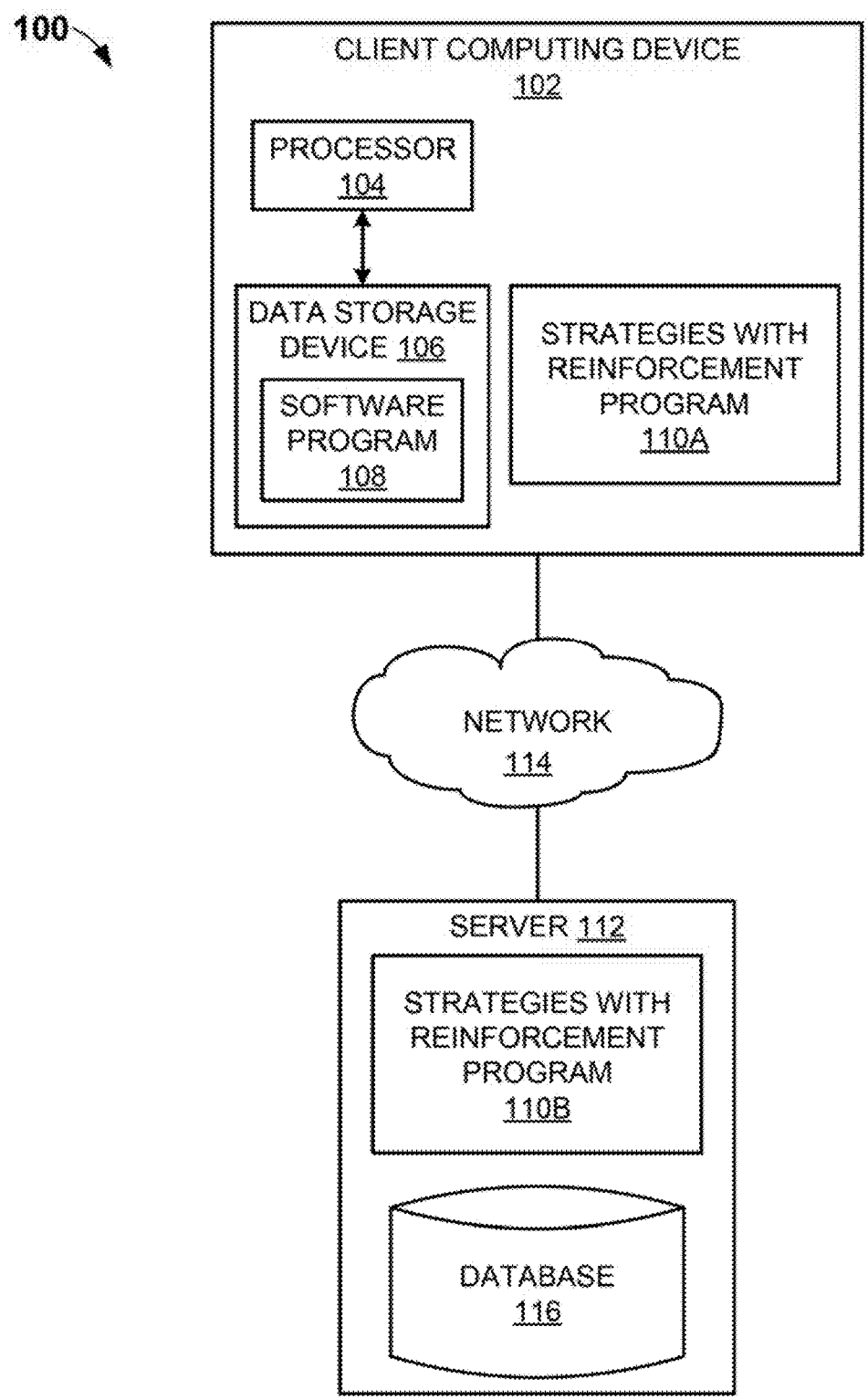
FIG. 1 illustrates an exemplary networked computer environment according to an embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to machine learning. The following described exemplary embodiments provide a system, method, and program product to, among other things, determine a best strategy to achieve a desired result. Therefore, the present embodiment has the capacity to improve the technical field of machine learning to implement a system to create a best strategy by utilizing exploration models, exploitation models, deep learning, visual interpretation, reinforcement learning and evolutionary computing to provide a fundamental algorithm for learning strategies. The learning strategies take into account cultural norms and ethical boundaries within the strategies fitness function to determine a best strategy for a situation.

The best strategy is a plan to achieve a desired outcome. Applicable situations may include steps to perform such things as navigation to reach a destination in a least amount of time, shopping for an item for a least expensive price, winning a game, planning an event with specific criteria and winning a sport event, among others.

Machine learning allows a computer system an ability to learn without being programmed by building a model based on data input. The model is formed by training using the data input and learning, and by calculation of parameters of an algorithm. The model is a product of machine learning and using the algorithm can make predictions and solve problems based on inputs.

The present embodiment combines exploration models and exploitation models. During reinforcement learning the algorithm determines an amount of risk is taken exploring new solutions compared to using known solutions. Exploration models use known solutions, while exploitation models consider new solutions within an unknown risk. Utilizing known solutions only risks utilization of models in a local optimum, by selecting a best solution from known solutions, and this is a risk because there may be better solutions which are unknown. Exploration models search a sample space for a possible solution. Exploitation models exploit a promising solution found from an exploration model by making a random variation. Exploitation models are new solutions which may be a better solution or may not be a better solution. Consideration of new possible solutions in exploitation models increases learning, by increasing an amount of possible solutions and increases a likelihood of finding a new best solution amongst a larger number of possible solutions from both exploration and exploitation.

Deep learning is a sub-category of machine learning and uses neural networks and may be referred to as a deep neural network. Deep learning is a way of using neural networks to learn feature representations of data through hierarchical models. There is an input layer and a series of hidden layers and an output layer. There are different types of topologies of neural networks. The neural network is trained using exemplars or training features inputted into the neural network which describe the data. The neural networks guesses the training features. A successful outcome strengthens a particular training feature and a non-successful outcome weakens a corresponding training feature. This process propagates a success or an error by adjust each of the weights in the neural network which improves over time with the task it is trying to learn.

Visual interpretation is analysis of a size, shape and position of objects, as well as contrast and color saturation.

Reinforcement learning is a computing agent taking action within an environment, getting a response back which is measuring the environment to figure out whether the action was a good action or a bad action. For example, if a robot is trying to learn how to walk, the robot turns on a motor and if a leg moves causing the robot to lift a leg off the ground, the particular action is rewarded.

Evolutionary computing is a family of algorithms inspired by biological evolution to try to achieve global optimization. Evolutionary computing is a way of following a Darwinism process, where only the fittest survive, and a possible solution to a problem is encoded into a chromosome. The chromosome is series of ones and zeros and bits. A combination of various chromosomes, or solutions, are encoded into DNA strands. Once each DNA strand is encoded, various biological operations can be done, for example, crossover, between DNA strands. When two chromosomes meet, they can exchange genetic material, which in this case is bits, such that two representations of problems are combined. When two chromosomes meet, the chromosomes can mutate, which entails random changes of bits from 1 to 0 or 0 to 1. Alternatively, when two chromosomes meet, they can migrate, when one type of population can migrate a set of bits over to another population. Over time a best chromosome or a best representation of bits can be found that solves a problem. Evolutionary computing is a method of searching a large search base. To determine if a chromosome is a good chromosome or bad chromosome, a fitness function is applied to determine if a particular chromosome is a good way of picking out best traits.

A fitness function evaluates how close a chromosome, or a particular solution, is to a best solution for a particular situation. A result of the fitness function is how fit a solution may be. A fitness function, or fitness function value, may range from 0 to 100%, with 100% a most successful outcome.

A fundamental algorithm for learning strategies is through reinforcement learning.

Cultural norms are shared rules and expectations of people within a social group. Ethical boundaries are personal rules for an individual or for a group of individuals, such as people in a particular profession.

Evolutional migration of ethical norms may be part of the fitness function. For example, when playing a tennis match, it is unethical for a player to hit the ball directly at an opponent. This may result in winning the point because the opponent cannot move out of the way, but it is not ethical to hit the ball directly at the opponent. The fitness function can be directly to encode a rule not to aim a shot directly at the opponent. A chromosome associated with aiming a shot directly at the opponent would have a lower fitness function value. Other examples might be garments. For example, a dress code may require a particular color of outfit, and if the player picks an outfit of an incorrect color, then a corresponding encoded chromosome is penalized due to not meeting the dress code. A player may have personal norms as well, such as a limitation on a type of clothing which is preferred to be worn when playing. When the player is not following ethical norms, cultural norms or personal norms, a corresponding fitness function associated with that chromosome is lowered. When the player is following ethical norms or cultural norms, then a corresponding fitness function associated with that chromosome is increased.

An application of this invention is to win a point in a tennis match. A player seeks to hit a shot with their tennis racquet which an opponent cannot successfully return, resulting in the player winning a point. For each of the hundreds of shots a player hits in a tennis match, the player decides where to aim the shot and which type of swing is used when hitting the ball. A shot taken by a player in a tennis match may include a type of swing and a location on an opponent's court that a tennis ball is aimed to. The probability of winning the point is dependent on a multitude of variables, such as a position of each player, a previous shot location, a previous shot speed, etc. Due to a large number of variables, a situation for every shot selection is unique and, therefore, a win probability for each shot location varies.

The present system trains a machine learning classifier using historical shot situations to predict tennis point win probabilities. To evaluate each of the shot location options available to a player, the system creates a series of variants for each shot situation. The shot location feature is varied across the series such that a variant exists for each potential shot location. The classifier then predicts a win probability for each variant to determine an optimal shot location given a shot situation. The system presents the shot selection options visually by using coordinates of each shot location zone to form a grid overlay upon a tennis court image. To represent the relative merit among the locations, the grid zones may be color coded or gray scaled according to a predicted win probability for shots to each grid zone.

The present system uses an evolved cartesian grid which represent strategies, an exploration strategy mixed with an exploitation strategy, a reinforced cartesian grid learning with qtable updating, and evolutionary migration of ethical norms into a fitness function. In other embodiments, rather than a cartesian grid with x,y axis, the system may be applied to physical space with an x, y and z axis, to a polar coordinate system with a distance from a reference point and an angle from a reference direction, or other space representations.

An evolved cartesian grid strategy is encoding of a strategy with parameters from the output of a convoluted neural network, (hereinafter "CNN"), into a chromosome. A CNN is a class of deep neural networks used in deep learning, and is commonly applied to analyzing visual imagery. A reinforced learned strategy is a probabilistic view of taking an action and then interpreting the result.

A qtable keeps track of a set of chromosomes, tracking each chromosome's fitness function and evolves over time during learning. The learning can be in a physical world, or in an augmented reality, for example, various aspects of trying to learn what an image is. A higher fitness function value for a chromosome indicates that chromosome is a good solution for a particular situation. A lower fitness function vale for a chromosome indicates that chromosome is not as good a solution for that particular situation.

In an embodiment, a qtable may be associated to a slice within a 3-dimensional plane, and a group of qtables associated to the entire 3-dimensional plane.

In an embodiment, the present system trains a machine learning classifier using historical shot situations to predict tennis point win probabilities. To evaluate each of the shot location options available to a player, the system creates a series of variants for each shot situation. The shot location feature is varied across the series such that a variant exists for each potential shot location. The classifier then predicts the win probability for each variant to determine the optimal shot location or grid zone given the shot situation.

For example, for tennis, the qtable may have a first column identifying a shot type, and a $2^{nd}$ column indicating a probability of winning a point associated with each shot type in the $1^{st}$ column.

The system may present the shot selection options visually by using coordinates of each shot location or zone to form a grid overlay upon a tennis court image. To represent a relative merit among the locations, the zones may be colored according to a predicted win probability for a shot to each zone. A resulting heat map includes the image divided into zones, and within each zone, the heat map shows a relative intensity of values using a color representation.

An opponent's side of a tennis court may be assigned to a cartesian grid. A qtable is associated to each location or zone on a cartesian grid, resulting in multiple qtables. In an embodiment, the opponent's court may be broken down to square yards within the court. The resulting qtables identifies a probably of winning a point by taking a certain shot aiming at the corresponding location. The multiple qtables are updated based on reinforcement, depending on a won or lost point, played with a particular shot to a particular location.

In an embodiment, this invention can be used for tennis players during training, it can be used by players, it can be used by fans, and could be used by sports announcers. An alternate embodiment may be used for any decision tree, such as shopping, navigation, event planning, education, or other situations.

The following described exemplary embodiments provide a system, method, and program product to determine a best strategy for a situation to increase a likelihood of a best outcome using a heat map interpretation with a dilation based interlaced exploitation and exploration methods, which take into account ethical norms or value systems into a fitness function. The best outcome uses chromosomes to represent strategies and associating with qtables.

Referring to FIG. 1, an exemplary networked computer environment 100 is depicted, according to an embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a strategies with reinforcement program 110A and communicate with the server 112 via the communication network 114, in accordance with an embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 6, the client computing device 102 may include internal components and external components, respectively.

The server 112 may be a laptop computer, netbook computer, personal computer (PC), a desktop computer, or any programmable electronic device or any network of programmable electronic devices capable of hosting and running a strategies with reinforcement program 110B and a database 116 and communicating with the client computing device 102 via the communication network 114, in accordance with embodiments of the invention. As will be discussed with reference to FIG. 6, the server computer 112 may include internal components and external components, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the strategies with reinforcement program 110A, 110B may be a program capable of determining a best strategy to increase a likelihood of a best outcome. The strategies with reinforcement method is explained in further detail below with respect to FIGS. 2-5.

Figure 2:
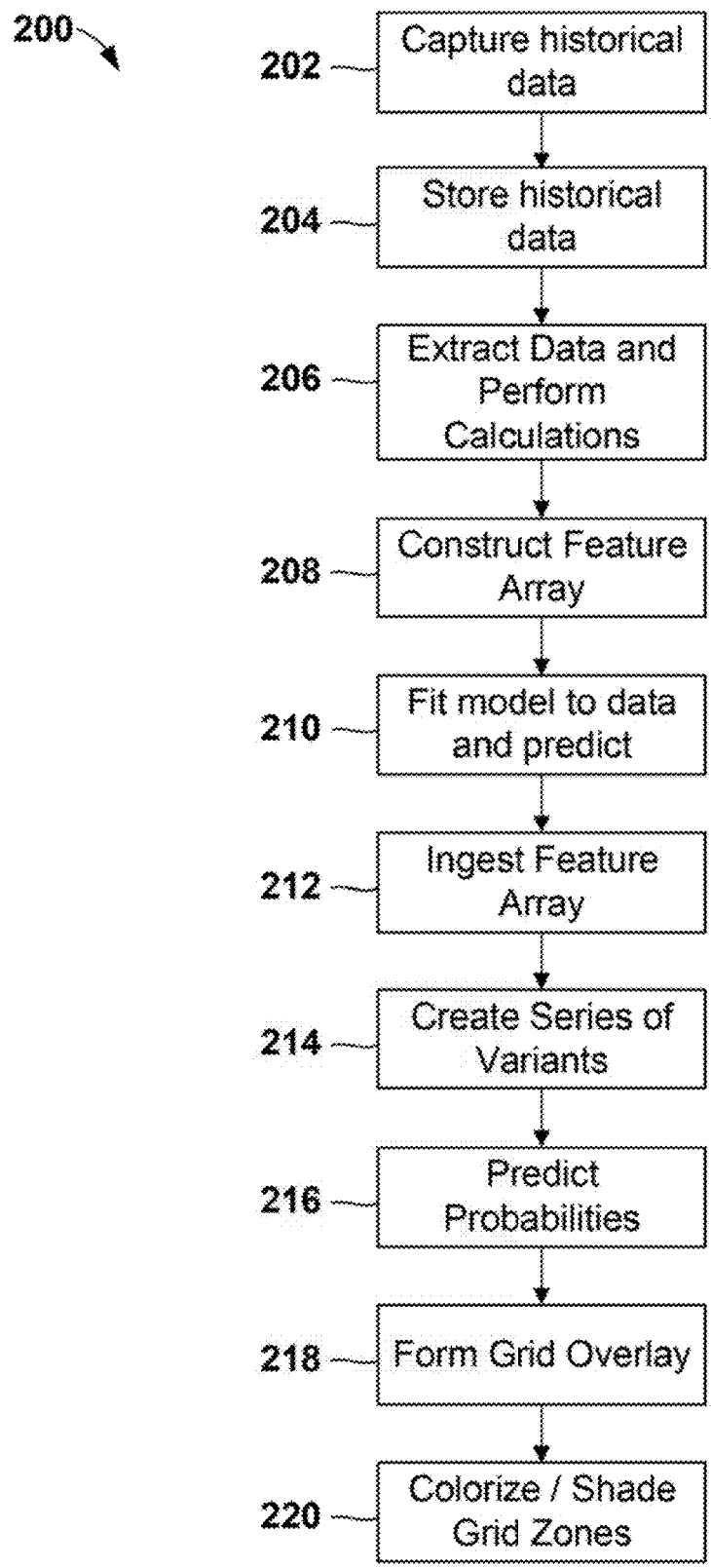
FIG. 2 illustrates an operational flowchart illustrating a setup process, according to an embodiment.

Referring now to FIG. 2, an operational flowchart illustrating a setup process 200 is depicted according to an embodiment.

The setup process 200 captures existing information such as steps to perform a desired outcome, and whether or not the desired outcome is achieved. Specifically, details are included for an embodiment of playing tennis with a desired outcome of winning a point.

Capturing historical data is performed at step 202. In the embodiment, one or more cameras capture a tennis player and tennis ball movements across a tennis court. The one or more cameras also track an opponent on an opposite side of the tennis court.

A system, for example the client computing device 102 of FIG. 1, stores the historical data at step 204. The historical data was captured by the one or more cameras. In the embodiment, the historical data includes position data of the player, position data of the opponent, and position data of the tennis ball for each frame of video captured by the one or more cameras, for each point of the match. Additional data may include a location of the tennis match, a date, a time of day, and other information.

Data extraction and calculations are performed at step 206. For the embodiment, the system extracts data from the position data and performs calculations from the data to produce features relevant to predicting whether the play has won or lost a point (point outcome). The features may include positional data, including speed of the ball, speed of the player and the opponent, position of the player and position of the opponent, among other specific measurements. The features may include a competitive situation of each point, such as court side, game point, break point, weather conditions, court surface, etc. The features may further include player biographical information, such as right or left-handed, height, weight, ranking, etc.

A 2-dimensional, (hereinafter "2D"), feature array may be constructed at step 208. In the embodiment, the 2D feature array may include a row for each point, or alternatively for each shot, and a column for each feature.

A machine learning model is fit to the data, at step 210, using the feature array to predict a point outcome such that the loss function is minimized by using cross-entropy, etc., in the embodiment. Various classification algorithms may be employed for this purpose, including tree-based models, ensemble models, neural networks, support vector machines, etc. Cross-entropy is an example of a loss function.

The system ingests a one-dimensional (hereinafter "1D"), feature array for a specific scenario at step 212. For the embodiment, the specific scenario is for a specific point scenario of the tennis match. A specific point scenario may be game point, or match point, or 15-0, etc.

The system creates a series of variants of the feature array, at step 214. For the embodiment only the shot location zone feature is varied such that a variant is created for each shot location zone.

The machine learning model predicts a probability for each variant at step 216. For the embodiment, a probability that a point outcome is a win is predicted for each variant.

The system forms a grid overlay at step 218. In the embodiment, the system uses the coordinates of each shot location zone to form a grid overlay upon a tennis court image. The grid overlay may show a predictive feature of winning a point for each type of shot. For example, for a backhand shot to a specific location on the tennis court, what is the prediction of winning the point when a backhand is hit to each location. Perhaps a backhand shot to a back right corner of the opponents court may have a high probability of winning the point, while a backhand shot to a middle of the back line of the opponents court may have a medium probably of winning the point and a backhand shot to a middle of the opponents court may have a low probably of winning the point.

Colorization of the grid overlay is done by the system at step 220. In the embodiment, the grid zones are colored, or put into a gray scale, according to the predicted win probability for that shots to that zone. For example, warmer colors such as blue may show a higher probably of winning a point for a particular shot aimed at a specific location on an opponents tennis court, while cooler coolers such as red show a lower probability of winning a point for a particular shot aimed at a specific location on the opponents tennis court. Alternatively, a darker gray scale may show a higher probability of winning a point, while a lighter gray scale may show a lower probability of winning a point. There may be a colorized grid overlay for each type of shot, and for each type of shot for each different point scenario.

Figure 3:
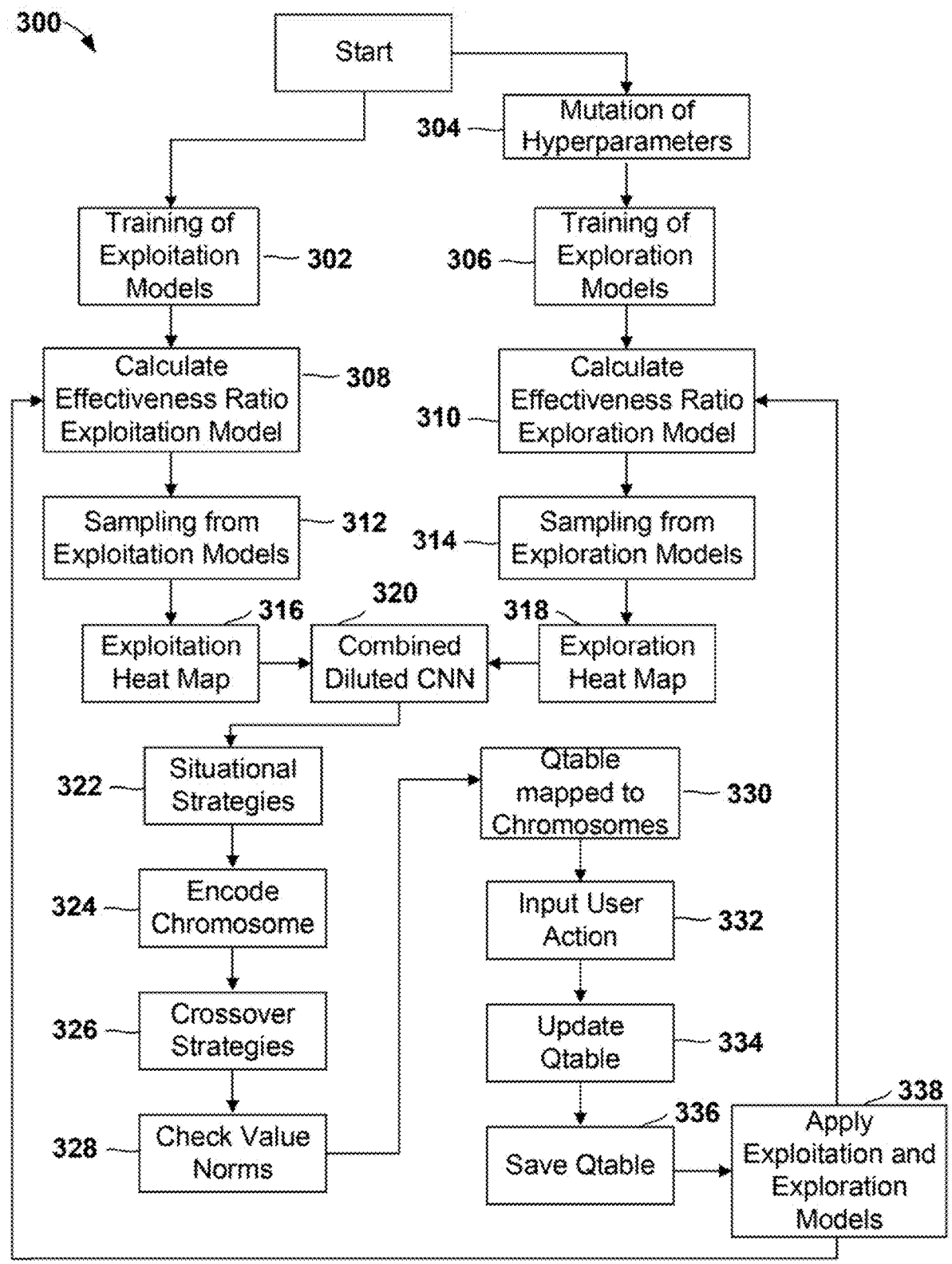
FIG. 3 illustrates a strategies with reinforcement process, according to an embodiment.

Referring now to FIG. 3, an operational flowchart illustrating a strategies with reinforcement process 300 is depicted according to an embodiment. The strategies with reinforcement program 110A, 110B starts with both training of exploitation models at step 302 and mutation of hyperparameters at step 304.

The training of exploitation models at step 302 uses encoded chromosomes, where variations of decision steps are encoded into a set of chromosomes. In the tennis match embodiment, different ways of hitting a tennis ball may be encoded into a set of chromosomes. Initially the system encodes different types of hits for each of the location zones of the other side of the tennis court into different chromosomes. A chromosome is a shot selector where each position on the chromosome is either a 0 or 1, and each position can be a type of shot, for example a serve, a forehand, a backhand, a volley, a lob shot, a drop shot, a spin shot, a shot speed, a shot angle, a shot direction, a shot target location on the grid, etc. For each one of these types of shot, if a position corresponding to a particular type of shot contains a 0, then the player does not take that kind of shot. There can be a mixing of shots, for example mixing a backhand and a forehand, may translate to when the tennis ball is coming directly at the player, the player takes the racket and hits forward in a way to hit the ball directly in front of themselves. Another example may be to hit a forehand combined with a lob shot. Some of the hits may be mutually exclusive, for example a right forehand shot cannot be combined with a left backhand shot.

In an embodiment, the chromosome length may be 40, corresponding to 40 different ways of hitting a tennis ball. The chromosome is a shot strategy, using a combination of one or more shot types. In an embodiment, 20 different chromosomes may be randomly chosen for each location zone.

A first subset of the randomly chosen chromosomes for each location zone may be selected for training at step 302. In an embodiment, half, or 10 of the chosen chromosomes for each location zone may be selected for training at step 302.

Training of exploitation models, step 302, includes training each of the first subset of the randomly chosen chromosomes as an input into a model of machine learning and evaluating a success or failure for each time it is evaluated. A fitness function for tennis may be winning a point for the player, and a chromosome for a zone which results in winning a point would have a higher fitness function value over time. A chromosome for a zone which results in a losing a point would have a lower fitness function value over time.

For the mutation of hyperparameters, step 304, a remaining, or second subset, of the randomly chosen chromosomes for each location zone may be selected. In an embodiment, the 10 remaining chosen chromosomes for each location zone may be selected for the second subset. For each of the 10 chromosomes of the second subset may have random bits mutated. In an embodiment, there may be a 5% mutation rate, where 5% of the positions on each chromosome is randomly switched from a 0 to a 1, or from a 1 to a zero, along the DNA strand. The mutation of hyperparameters, step 304, continues to training of exploration models, step 306.

In an embodiment, a number of randomly chosen chromosome selected for each location zone may increase depending on criteria, such as when beginning a training period, the player and their coach may be open to experimentation to trying different shot strategies. For example, the number of randomly chosen chromosomes selected for each location zone may increase to 40 or more chromosomes or shot strategies, depending on risk, where more risk may determine that more training which would take more time to optimize a shot strategy. Alternatively, a number of randomly chosen chromosome selected for each zone may be decreased, for example, when the player is closer to a competition and is fine tuning their shot strategy for pending tennis matches and good training results.

In an embodiment, a percentage of chromosomes used for exploitation, step 302, may increase over time, compared to a percentage of chromosomes used for exploration, for example 75% and 25%. In an embodiment, a percentage of chromosomes used for exploitation, step 302, may increase closer to a competition, compared to a percentage of chromosomes used for exploration.

Similar to the training of exploitation models, step 302, the training of exploration models, step 306, includes training each of the second subset of the chromosomes with randomly mutated bits are input into a model of machine learning and evaluated for a success or failure during training. A chromosome which results in the player winning a point would have a higher fitness function value over time. A chromosome for a zone which results in a losing a point would have a lower fitness function value over time.

The training of exploitation models, which are the first subset of the chromosomes, step 302, continues to calculation of an effectiveness ratio of the exploitation models, step 308. Similarly, the training of the exploration models, which are the second subset of the chromosomes, step 306, continues to calculation of an effectiveness ratio of the exploration models, step 310.

The calculation of an effectiveness ratio of the exploitation models, step 308, is performed for each chromosome of the first subset of chromosomes for each zone, and is a ratio of good outcomes compared to all outcomes. For the embodiment, the effectiveness ratio is a number of times a chromosome used resulted in a point won compared to a number of times which that chromosome was used, for the corresponding zone.

For example, a chromosome may identify a combination of shots which may not be possible, such as a left backhand combined with a right forehand. Over time, this chromosome would be penalized and would have a low effectiveness ratio, and would become a less likely shot over time.

Similarly, the calculation of an effectiveness ratio of the exploration models, step 310, is performed for each chromosome of the second subset of chromosomes for each zone, and is a ratio of good outcomes compared to all outcomes.

The calculation of an effectiveness ratio of the exploitation models, step 308, continues to sampling from exploitation models, step 312. Similarly, the calculation of an effectiveness ratio of the exploration models, step 310, continues to sampling from exploration models, step 314.

The sampling from exploitation models, step 312, selects a subset of the first set of chromosomes with the highest fitness functions, for each of the zones, as shown in the qtable for each zone. The qtable for a chromosome for a zone has fitness functions for each chromosome updated over time, as training progresses and each chromosome is evaluated.

The fitness function evaluates chromosomes based on a likelihood of success based on the effectiveness ratio of the exploitation model and is also based on an alignment with cultural norms, ethical norms and any individual player norms.

In an embodiment, the subset of the first set of chromosomes may include the best 5 chromosomes with the highest effectiveness ratios.

Similarly, the sampling from exploration models, step 314, selects a subset of the second set of chromosomes. The subset selects are the chromosomes with the fitness function in each respective qtable. In an embodiment, the subset of the second set of chromosomes may include the best 5 chromosomes with the highest fitness function.

The sampling from exploitation models, step 312, continues to generation of an exploitation heat map, step 316. Similarly, the sampling from exploration models, step 314, continues to generation of an exploration heat map, step 318.

The generation of the exploitation heat map, step 316, is a translation of the subset of the first set of chromosomes to a different data representation such that a neural network can understand it. In the game of tennis, the exploitation image heat map may represent the opponents court, with different colors or gray scale used on each grid location of the tennis court to indicate a variation based on fitness functions of the chromosomes for each grid of the tennis court.

On a first iteration of this process there will not be a fitness function available for each chromosome which can be used to create the heat map. For the first iteration a fitness function value would be randomly assigned to each grid location. Each subsequent step though the strategies with reinforcement process 300 would bring improve a calculation of a fitness function of each chromosome for each point on the grid, showing a probability of winning a point when a tennis ball is shot to that location on the grid. For each grid location, the fitness functions of the chromosomes are averaged to create the heat map. In an embodiment, the color red indicates a shot to that location is more likely to win the point, while the color blue indicates a shot to that location is less likely to win the point.

The generation of the exploration heat map, step 318, is a translation of the subset of the second set of chromosomes to this different data representation, similar to the generation of the exploitation heat map, step 316.

The generation of the exploitation heat map, step 316, and the generation of the exploration heat map, step 318, both continue to the combined diluted CNN step, 320.

The combined dilated CNN, step 320, combines the exploration heat map and the exploitation heat map and feeds the combined heat map into a CNN. Combining the exploration heat map and the exploitation heat map includes interlaces each pixel from the exploration heat map, and a corresponding pixel for the same grid location from the exploitation heat map, to form a combined pixel for that grid location. Interlacing the 2 pixels means the pixels from the exploitation heat map is altered with pixels from the exploration heat map. A resulting combined heat map provides a goodness, or chance of a successful outcome, of each of the grid location relative to other points on the grid. This provides an overall fitness function to each grid location. This combined heat map is fed into a CNN. Dilation means that during convolution of a neural network, some of the pixels are skipped. This gives us more lifelike interpretation of the interlaced pixels. The diluted CNN learns from the combined exploration heat map.

The combined diluted CNN, step 320, continues to forming situational strategies, step 322. Forming situational strategies may include collecting an output from the diluted CNN which identifies a recommended hit strategy for different situations. In the tennis match embodiment, different situations may include receiving a first serve, receiving a second serve, early in a match, later in a match. The recommended hit strategy may depend on a location where a ball is being hit from. In an embodiment, there could be any number of situational strategies for a player in tennis match.

The forming situational strategies, step 322, continues to encoding chromosomes strategies, step 324. Encoding chromosomes may include creating a new chromosome which corresponds to each of the recommended hit strategies identified in forming situational strategies, step 322.

The encoding chromosomes strategies, step 324, continues to forming crossover strategies, step 326. Forming crossover strategies may include single or double point crossover. A single point crossover is a randomly switch of a bit at the same location, between a chromosome pair. A double point crossover is a random switch, at a random location, of bits switched between a chromosome pair.

The forming crossover strategies, step 326, continues to checking of value norms, step 328. Checking of value norms may include evaluation of a fitness function of each of the new chromosomes encoded from the forming situational strategies step 322, and is based on an alignment with cultural norms, ethical norms and any individual player norms.

The checking of value norms, step 328, continues to setting up a qtable which includes each of the new chromosomes, step 330, for each grid location. The qtable includes a fitness function of each of the new chromosomes. Each fitness function may be based on an effectiveness ratio and alignment with cultural, ethical and individual player norms.

In a tennis match embodiment, there may be a qtable for each grid location of the tennis court and for each situation of the situational strategies.

The setting up a qtable mapped to each of the new chromosomes, step 330, continues to inputting of user action, step 332. Inputting of user action, will collect data on success and non-success for the user action, which can be related to the corresponding chromosome for that user action.

The inputting of user action, step 332, continues to update qtable, step 334. Based on the inputting of the user action, a corresponding effectiveness ratio and fitness functions is updated for the corresponding chromosome. The updated fitness function is updated in corresponding qtable, for each grid location and may be also dependent upon a particular situation.

The updating of each qtable, step 334, continues to saving each qtable, step 336. Each qtable for each grid location may be saved.

The saving each qtable, step 336, continues to applying exploitation and exploration models, step 338. Applying exploitation and exploration models, step 338, applies updated chromosomes to feed into both the calculate effectiveness ratio for the exploitation model, step 308, and into the calculate effectiveness ratio exploration model, step 310. During exploration, a risk is taken of picking a strategy that might not be optimal. Mutation rates help us to explore strategies. During exploitation, there is a very low mutation rate so the search space is bounded, searching in a familiar spaces for best strategies.

The strategies with reinforcement process 300 provides a user with recommended actions for a set of circumstances to attempt to achieve a successful outcome. For the embodiment of a tennis match, one or more recommended hit combinations may be provided, given a set of circumstances, such as where an opponent has hit the ball from, a type of hit from the opponent, a speed an angle which the ball is approaching the player, a state of the match, and more items. Given the set of circumstances, there may be provided a color-coded heat map, or a gray scale heat map, indicating a recommended grid location to hit the ball towards, and a recommended type of hit which would have the highest likelihood of winning the point.

Figure 4:
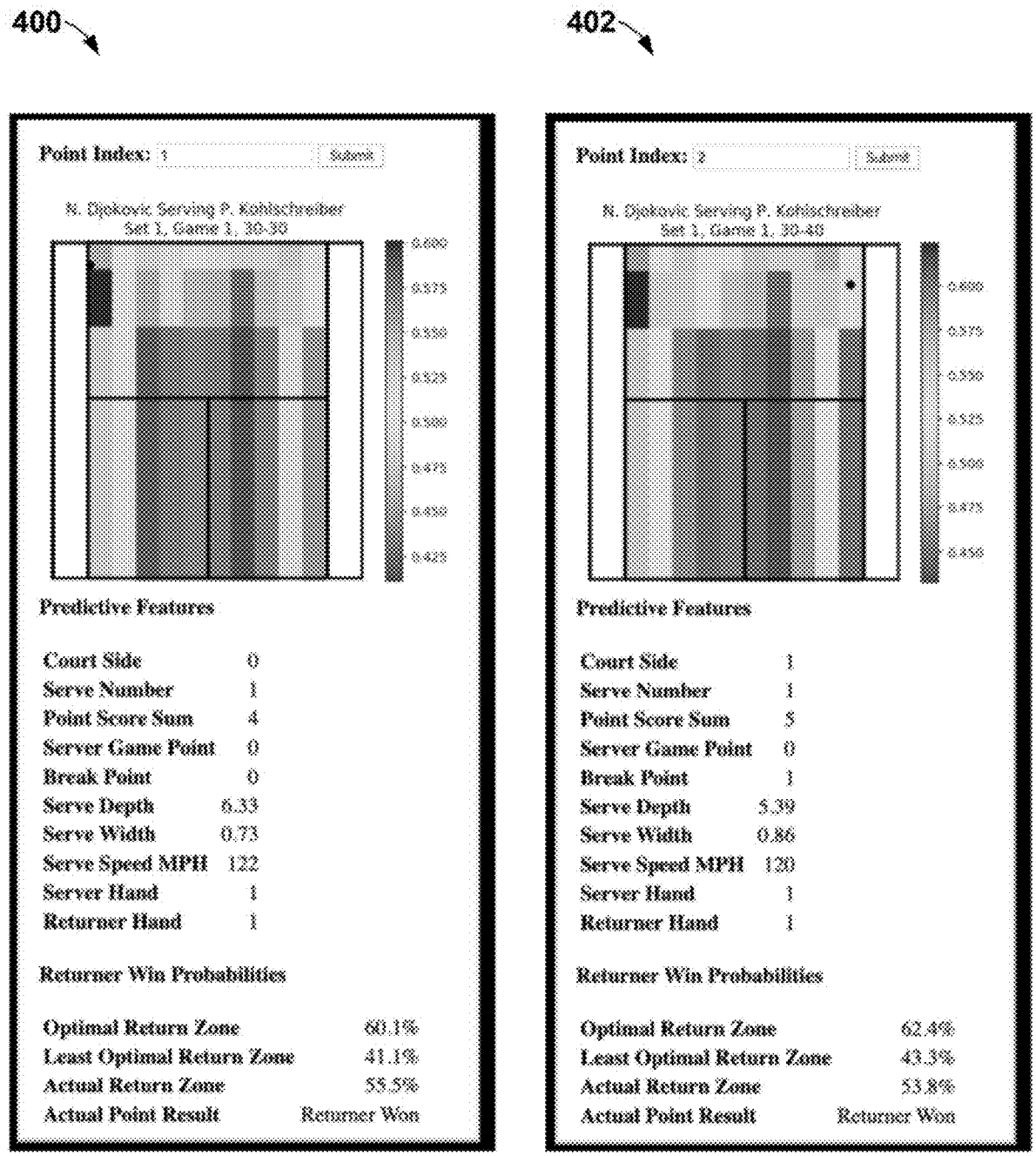
FIG. 4 illustrates a heat map according to an embodiment.

Referring now to FIG. 4, a heat map 400 and a heat map 402 are shown, according to an embodiment. The heat map 400 and the heat map 402 are each a color heat map showing a map of an opponent's tennis court and a gray scale likelihood of winning a tennis point if a tennis ball is hit towards an applicable grid location of the opponent's tennis court. A color of black on the grid location has a higher likelihood of winning the tennis point by hitting a ball to those locations. A color of white on the grid location has a lower likelihood of winning the tennis point by hitting a ball to those locations. Different shades of black, white and gray show the likelihood of winning the tennis point, with darker colors demonstrating a higher likelihood of winning the tennis point.

Additional examples of data which may be included in the tracking and used for evaluation of hit effectiveness include court side, serve number, point score sum, server game point, break point, serve depth, serve width, serve speed, server hand, right or left and returner hand, right or left.

The strategies with reinforcement process 300 may provide an applicable heat map, along with a point win probability for an optimal return zone, a point win probability for a least optimal return zone, a point win probability for an actual return zone, and an actual point result.

Figure 5:
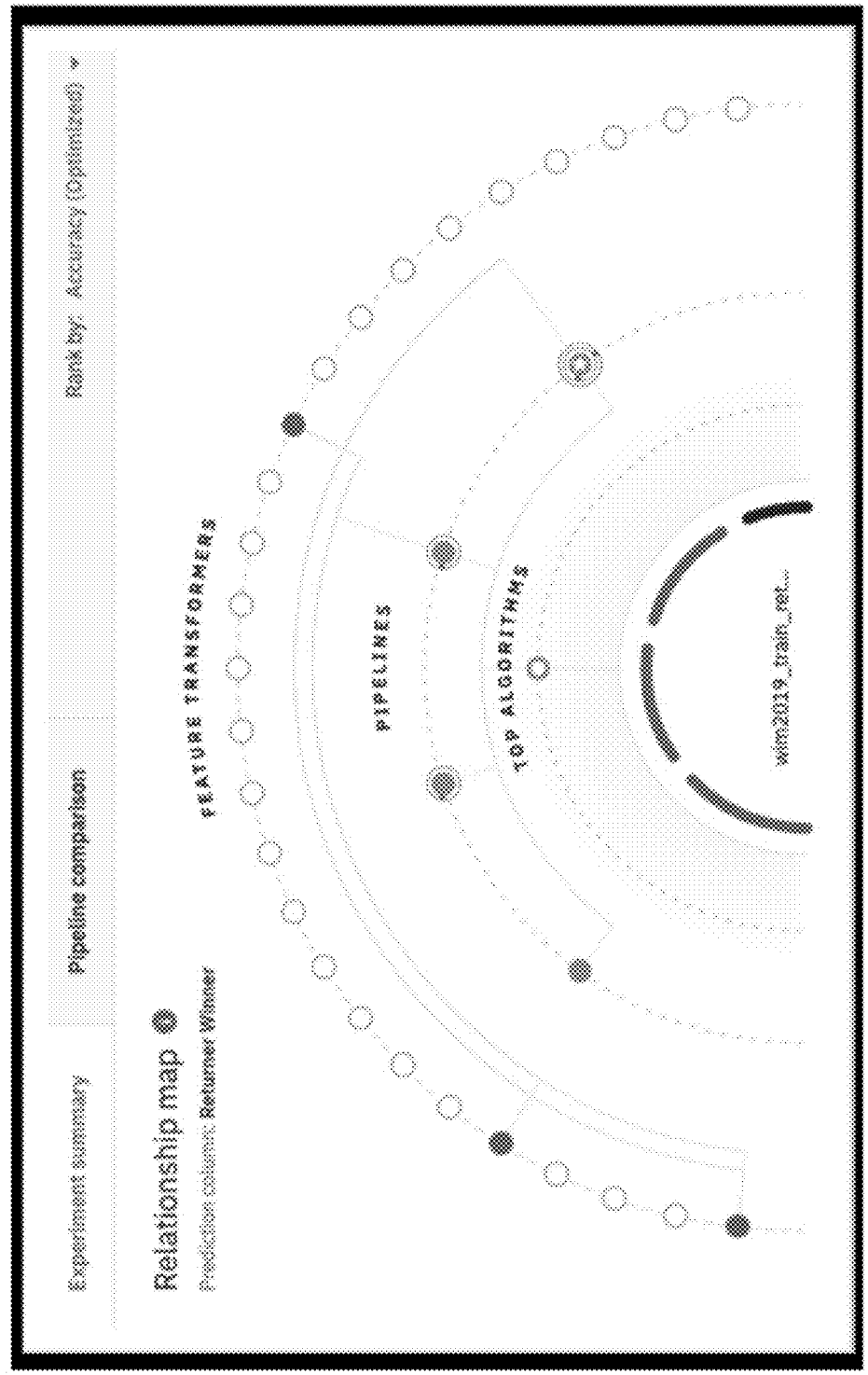
FIG. 5 illustrates an algorithm selection process, according to an embodiment.

Referring now to FIG. 5, an algorithm selection process 500 is shown, according to an embodiment. The algorithm selection process 500 shows training which may be used by the strategies with reinforcement process 300. In this embodiment, beginning at the lower center of the algorithm selection process 500 as shown in FIG. 5, the data may be feed into different algorithms and a top algorithm which provides a best fit of the data may be selected. The top algorithm may be a link into one or more pipelines and a best fit of the pipeline may line up to one or more feature transformers. The one or more pipelines allow the data to be shared between the top algorithm and the feature transformer. The feature transformer is a method to normalize predictors before input into a learning algorithm. This ensures the learning algorithm can understand the input data.

Examples of relevant code snippets for the strategies with reinforcement process 300 are provided below in Table 1.

TABLE 1

Relevant Code Snippets

```
# AutoAI defines preprocessing steps
preprocessor_pipeline = sklearn.pipeline.Pipeline(steps=preprocessor_steps)
steps.append(('preprocessor', preprocessor_pipeline))
# AutoAI selects ML algorithm and applies tuned hyperparameters
steps.append(('estimator',
sklearn.ensemble.gradient_boosting.GradientBoostingClassifier(criterion='friedm
an_mse',
init=None,
learning_rate=0.1, loss='deviance', max_depth=3,
max_features=None, max_leaf_nodes=None,
min_impurity_decreased=0.0, min_impurity_split=None,
min_samples_leaf=1, min_samples_split=2,
min_weight_fraction_leaf=0.0, n_estimators=100,
n_iter_no_change=None, presort='auto', random_state=33,
subsample=1.0, tol=0.0001, validation_fraction=0.1,
verbose=0, warm_start=False)))
# AutoAI assembles and fits ML pipeline
pipeline = sklearn.pipeline.Pipeline(steps=steps)
pipeline.fit(X, y)
# Create variants of actual data for each possible shot location
self.obs = df.loc[self.point_idx].copy( )
df = pd.DataFrame([self.obs] * 30)
return_locations = ['SR1', 'SR2', 'SR3', 'SR4', 'SR5', 'SR6', 'SR7', 'SR8',
'SR9', 'SR10',
```

TABLE 1-continued

Relevant Code Snippets

```
'MR1', 'MR2', 'MR3', 'MR4', 'MR5', 'MR6', 'MR7', 'MR8', 'MR9', 'MR10',
'DR1', 'DR2', 'DR3', 'DR4', 'DR5', 'DR6', 'DR7', 'DR8', 'DR9', 'DR10'
]
df['Return Grid Location'] = return_locations
feature_set = df[fields]
array_rows = list(feature_set.to_numpy( ))
# Get predictions from Watson Machine Learning service for each variant
fields = ['Court Side', 'Serve Number', 'Point Score Sum', 'Server Game Point',
'Break Point',
'Serve X', 'Serve Abs Y', 'Serve Speed MPH', 'Server Hand', 'Returner Hand',
'Return Grid
Location']
rows = [list(x) for x in array_rows]
payload_scoring = {
"input_data": [
{
"fields": fields,
"values": rows
}
]
}
header = {'Content-Type': 'application/json', 'Authorization': 'Bearer ' +
iam_token, 'MLInstance-
ID': ml_instance_id}
response_scoring = requests.post(scoring_endpoint, json=payload_scoring,
headers=header)
# Construct Heatmap
img = mpimg.imread("./img_input/court_diagram.5.png")
fig, ax = plt.subplots( )
short_probs = np.array([self.response_df.loc[:9, 'win_prob'].values])
mid_probs = np.array([self.response_df.loc[10:19, 'win_prob'].values])
deep_probs = np.array([self.response_df.loc[20:29, 'win_prob'].values])
self.worst_prob = self.response_df['win_prob'].min( )
self.best_prob = self.response_df['win_prob'].max( )
short_heat = ax.imshow(short_probs, extent=[−4.1148, 4.19, 0, 8.8872],
alpha=1.0,
cmap='coolwarm', vmin=self.worst_prob, vmax=self.best_prob)
mid_heat = ax.imshow(mid_probs, extent=[−4.1148, 4.19, 8.8872, 10.8872],
alpha=1.0,
cmap='coolwarm', vmin=self.worst_prob, vmax=self.best_prob)
deep_heat = ax.imshow(deep_probs, extent=[−4.1148, 4.19, 10.8872, 11.8872],
alpha=1.0,
cmap='coolwarm', vmin=self.worst_prob, vmax=self.best_prob)
return_depth = self.obs['Return X'] # X
return_width = −1 * self.obs['Return Y'] # Y
ax.imshow(img, extent=[−5.4864, 5.4864, 0, 11.8872], alpha=1.0)
ax.scatter([return_width], [return_depth], marker='o', c='black')
ax.axis('off')
ax.set_title(self.desc)
fig.colorbar(short_heat)
    fig.savefig('./static/images/{ }.png'.format(self.point_idx),bbox_inches
='tight')
```

The strategies with reinforcement process 300 can be used during training for a player to learn how to beat an opponent while practicing. Coaches may use the system while watching play to see how well the player is following what was learned during training. For fans, the system can show a recommended strategy for a player to increase a probability of winning a win, to win a set, and to win a match.

It may be appreciated that FIG. 2-5 provides only an illustration of an implementation and does not imply any limitations with regard to how different embodiments may be implemented. Many modifications to the depicted environments may be made based on design and implementation requirements.

Figure 6:
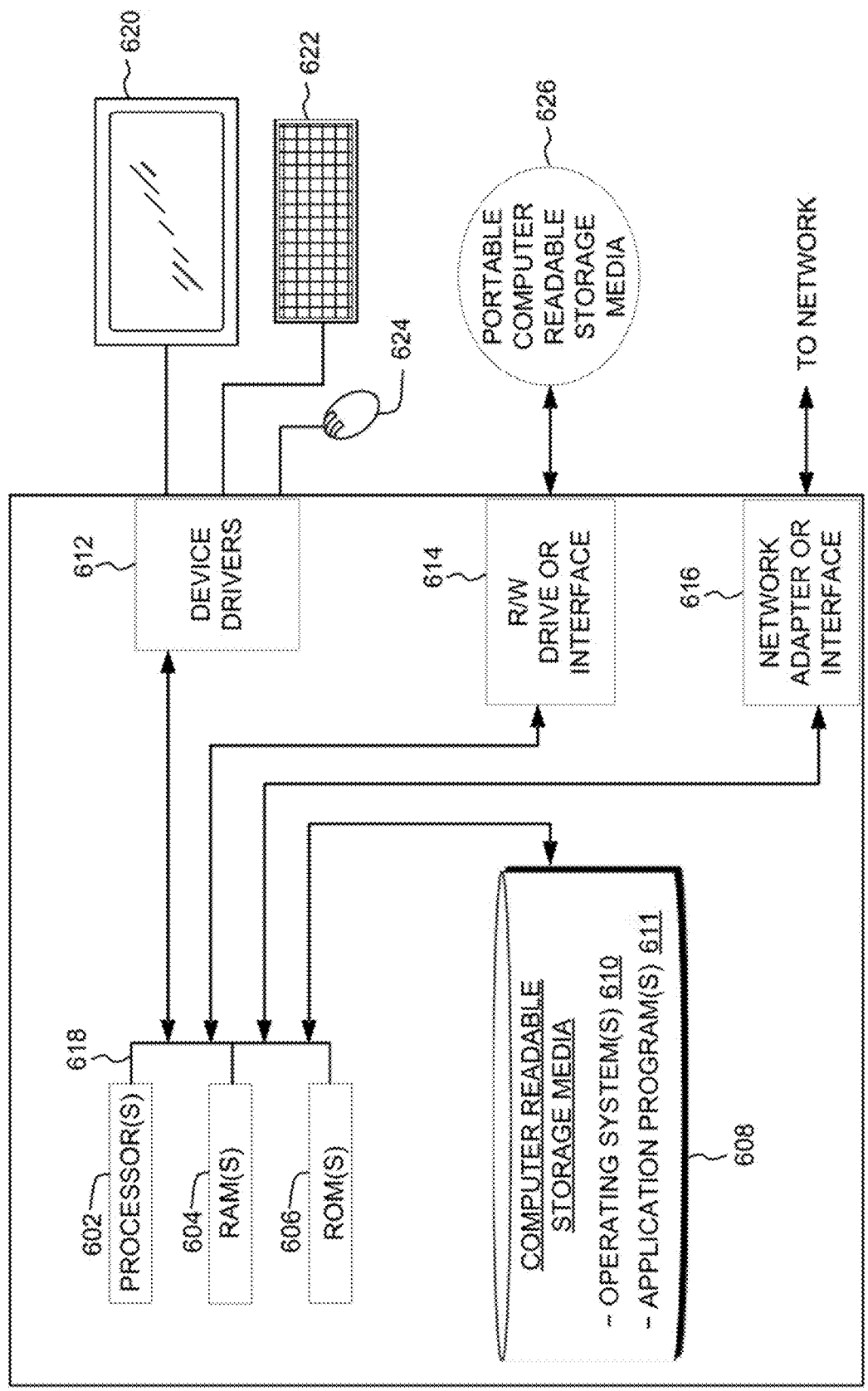
FIG. 6 illustrates a block diagram of internal and external components of computers and servers depicted in FIG. 1 according to an embodiment.

Referring now to FIG. 6, a block diagram of components of a computing device, such as the server 112 of FIG. 1, in accordance with an embodiment of the present invention is shown. It should be appreciated that FIG. 6, provides only an illustration of an implementation and does not imply any limitations with regard to the environments in which different embodiments may be implemented. Many modifications to the depicted environment may be made.

The computing device may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611 are stored on one or more of the computer readable storage media 608 for execution by one or more of the processors 602 via one or more of the respective RAMs 604 (which typically include cache memory). For example, the strategies with reinforcement process 300 may be stored on the one or more of the computer readable storage media 608. In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include the R/W drive or interface 614 to read from and write to one or more portable computer readable storage media 626. Application programs 611 on the computing device may be stored on one or more of the portable computer readable storage media 626, read via the respective R/W drive or interface 614 and loaded into the respective computer readable storage media 608.

The computing device may also include the network adapter or interface 616, such as a TCP/IP adapter card or wireless communication adapter (such as a 4G wireless communication adapter using OFDMA technology). Application programs 611 may be downloaded to the computing device from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

The computing device may also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
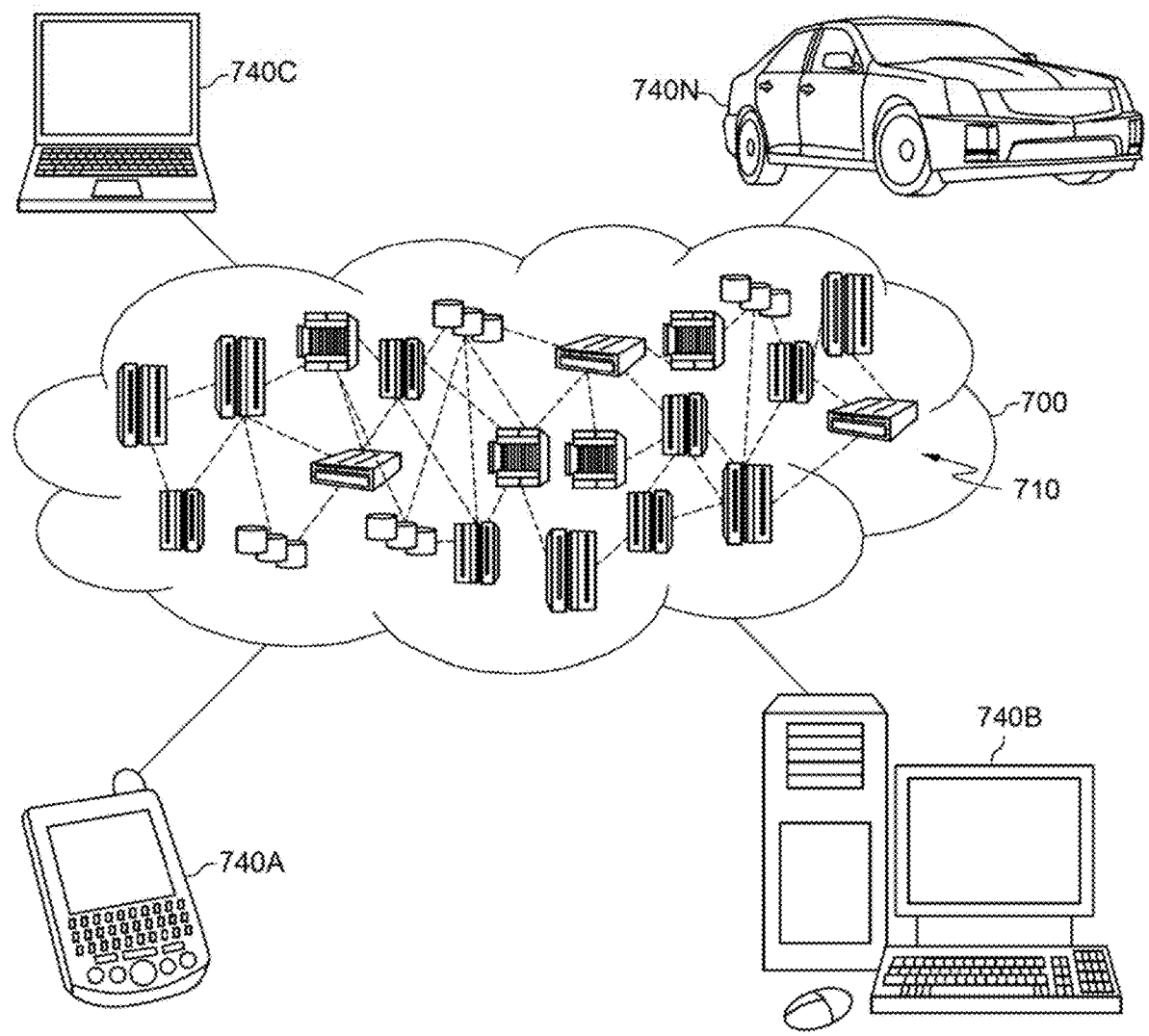
FIG. 7 illustrates a cloud computing environment according to an embodiment of the present invention.

Referring now to FIG. 7, illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 740A, desktop computer 740B, laptop computer 740C, and/or automobile computer system 740N may communicate. Cloud computing nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 740A-N shown in FIG. 7 are intended to be illustrative only and that cloud computing nodes 710 and cloud computing environment 700 can communicate with any type of computerized device over any type of network and/or network addressable connection (e.g., using a web browser).

Figure 8:
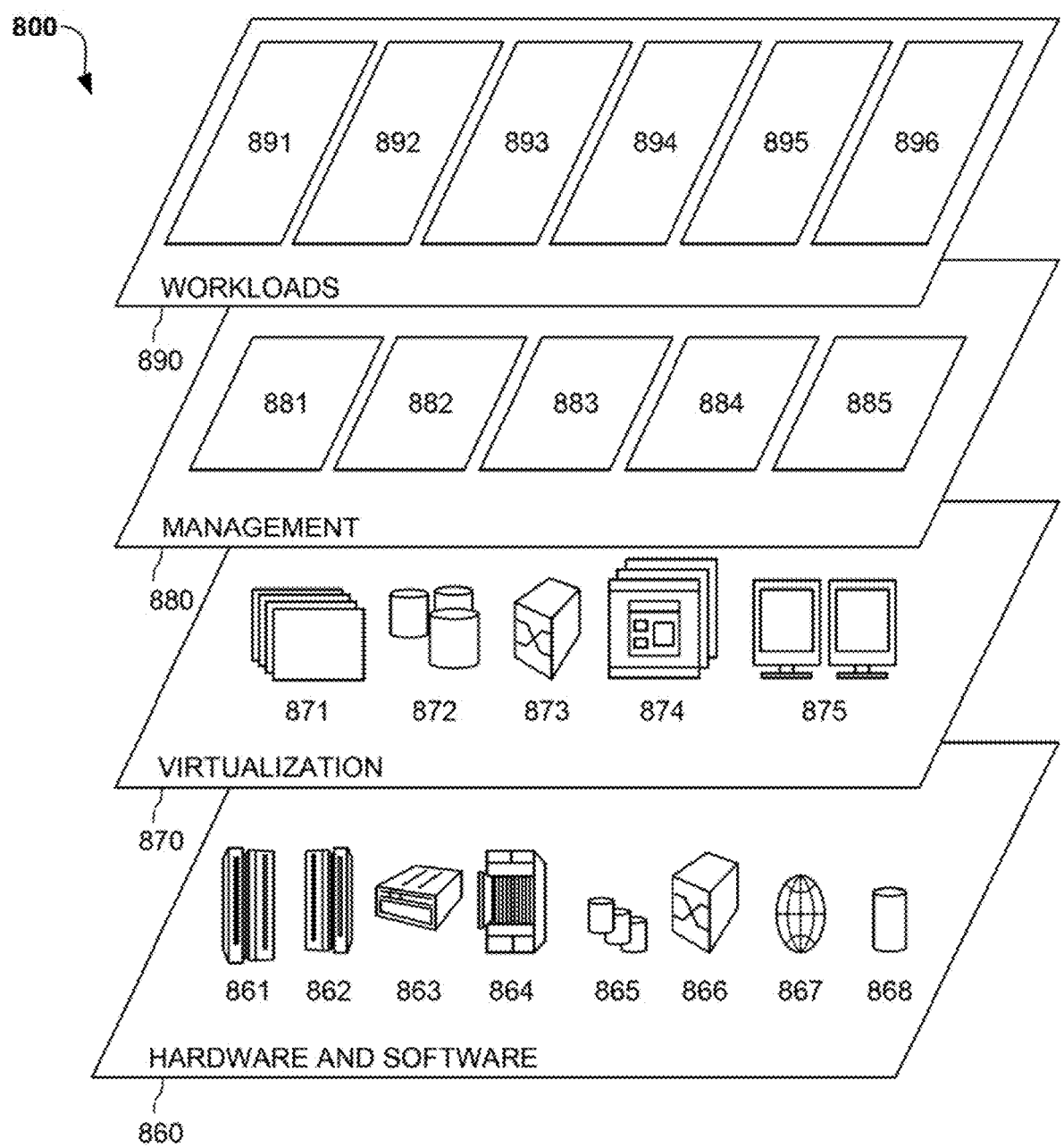
FIG. 8 illustrates abstraction model layers according to an embodiment of the present invention.

Referring now to FIG. 8, a set of functional abstraction layers provided by cloud computing environment 700 (as shown in FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872, for example the data storage device 106 as shown in FIG. 1; virtual networks 873, including virtual private networks; virtual applications and operating systems 874; and virtual clients 875.

In an example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and strategies with reinforcement 596. The strategies with reinforcement 596 may determine a best strategy.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for machine learning, the method comprising:
    training a set of exploitation models using a first subset of randomly chosen chromosomes of a set of encoded chromosomes, wherein each encoded chromosome of the set of encoded chromosomes comprises a variation of decision step;
    evaluating a success or a failure of each chromosome of the first subset of randomly chosen chromosomes;

calculating an effectiveness ratio of each exploitation model of the set of exploitation models by measuring a ratio of successful outcomes compared to all outcomes;

performing the above method steps while simultaneously:
mutating a first fixed percentage of random bits of each chromosome of a second set of randomly chosen chromosomes of the set of encoded chromosomes;
training a set of exploration models using the second set of randomly chosen chromosomes;
evaluating a success or a failure of each chromosome of the second subset of randomly chosen chromosomes; and
calculating an effectiveness ratio of each exploration model of the set of exploration models by measuring a ratio of successful outcomes compared to all outcomes;

generating a combined exploitation and exploration heat map based on a translation of the first subset and a translation of the second subset to a different data representation that a neural network can understand;
inputting the combined exploitation and exploration heat map into a convoluted neural network;
generating a set of situational strategies from an output of the convoluted neural network which identifies a set of recommended strategy for a corresponding set of different situations; and
updating a qtable for each chromosome of the set of situational strategies based on user actions and based on norms.

2. The processor-implemented method of claim 1, further comprising:
mutating a second fixed percentage of random bits of each chromosome of the second set of randomly chosen chromosomes of the set of encoded chromosomes, wherein the second fixed percentage is greater than the first fixed percentage.

3. The processor-implemented method of claim 1, further comprising:
selecting a subset of the set of exploitation models based on a fitness function value of each exploitation model of the set of exploitation models, wherein the fitness function value is based both on a corresponding effectiveness ratio and on an alignment with cultural, ethical and individual norms, of each exploitation model;
selecting a subset of the set of exploration models based on a fitness function value of each exploration model of the set of exploration models, wherein the fitness function value is based both on a corresponding effectiveness ratio and on an alignment with cultural, ethical and individual norms, of each exploration model; and
generating the combined exploitation and exploration heat map based on a translation of the first subset and a translation of the second subset to a different data representation that a neural network can understand by interlacing the third subset and the fourth subset.

4. The processor-implemented method of claim 1, further comprising:
selecting a set of crossover strategies from an output of the convoluted neural network by randomly switching a bit of a same location between a chromosome pair of the set of encoded chromosomes; and
updating a qtable for each chromosome of the set of crossover strategies based on user actions and based on norms.

5. The processor-implemented method of claim 1, further comprising:
inputting a user action by collecting data on success and non-success for the user action and relating the user action to a corresponding chromosome of the set of encoded chromosomes.

6. A computer system for machine learning, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
training a set of exploitation models using a first subset of randomly chosen chromosomes of a set of encoded chromosomes, wherein each encoded chromosome of the set of encoded chromosomes comprises a variation of decision step;
evaluating a success or a failure of each chromosome of the first subset of randomly chosen chromosomes;
calculating an effectiveness ratio of each exploitation model of the set of exploitation models by measuring a ratio of successful outcomes compared to all outcomes;
performing the above method steps while simultaneously:
mutating a first fixed percentage of random bits of each chromosome of a second set of randomly chosen chromosomes of the set of encoded chromosomes;
training a set of exploration models using the second set of randomly chosen chromosomes;
evaluating a success or a failure of each chromosome of the second subset of randomly chosen chromosomes; and
calculating an effectiveness ratio of each exploration model of the set of exploration models by measuring a ratio of successful outcomes compared to all outcomes;
generating a combined exploitation and exploration heat map based on a translation of the first subset and a translation of the second subset to a different data representation that a neural network can understand;
inputting the combined exploitation and exploration heat map into a convoluted neural network:
generating a set of situational strategies from an output of the convoluted neural network which identifies a set of recommended strategy for a corresponding set of different situations; and
updating a qtable for each chromosome of the set of situational strategies based on user actions and based on norms.

7. The computer system of claim 6, further comprising:
mutating a second fixed percentage of random bits of each chromosome of the second set of randomly chosen chromosomes of the set of encoded chromosomes, wherein the second fixed percentage is greater than the first fixed percentage.

8. The computer system of claim 6, further comprising:
selecting a subset of the set of exploitation models based on a fitness function value of each exploitation model of the set of exploitation models, wherein the fitness function value is based both on a corresponding effectiveness ratio and on an alignment with cultural, ethical and individual norms, of each exploitation model;
selecting a subset of the set of exploration models based on a fitness function value of each exploration model of the set of exploration models, wherein the fitness function value is based both on a corresponding effectiveness ratio and on an alignment with cultural, ethical and individual norms, of each exploration model; and
generating the combined exploitation and exploration heat map based on a translation of the first subset and a translation of the second subset to a different data representation that a neural network can understand by interlacing the third subset and the fourth subset.

9. The computer system of claim 6, further comprising:
selecting a set of crossover strategies from an output of the convoluted neural network by randomly switching a bit of a same location between a chromosome pair of the set of encoded chromosomes; and
updating a qtable for each chromosome of the set of crossover strategies based on user actions and based on norms.

10. The computer system of claim 6, further comprising:
inputting a user action by collecting data on success and non-success for the user action and relating the user action to a corresponding chromosome of the set of encoded chromosomes.

11. A computer program product for machine learning, the computer program product comprising:
one or more computer-readable tangible storage medium and program instructions stored on at least one of the one or more tangible storage medium, the program instructions executable by a computing system to cause the computing system to preform a method comprising:
training a set of exploitation models using a first subset of randomly chosen chromosomes of a set of encoded chromosomes, wherein each encoded chromosome of the set of encoded chromosomes comprises a variation of decision step;
evaluating a success or a failure of each chromosome of the first subset of randomly chosen chromosomes;
calculating an effectiveness ratio of each exploitation model of the set of exploitation models by measuring a ratio of successful outcomes compared to all outcomes;
performing the above method steps while simultaneously:
mutating a first fixed percentage of random bits of each chromosome of a second set of randomly chosen chromosomes of the set of encoded chromosomes;
training a set of exploration models using the second set of randomly chosen chromosomes;
evaluating a success or a failure of each chromosome of the second subset of randomly chosen chromosomes; and
calculating an effectiveness ratio of each exploration model of the set of exploration models by measuring a ratio of successful outcomes compared to all outcomes;
generating a combined exploitation and exploration heat map based on a translation of the first subset and a translation of the second subset to a different data representation that a neural network can understand;
inputting the combined exploitation and exploration heat map into a convoluted neural network;
generating a set of situational strategies from an output of the convoluted neural network which identifies a set of recommended strategy for a corresponding set of different situations; and
updating a qtable for each chromosome of the set of situational strategies based on user actions and based on norms.

12. The computer program product of claim 11, further comprising:
mutating a second fixed percentage of random bits of each chromosome of the second set of randomly chosen chromosomes of the set of encoded chromosomes, wherein the second fixed percentage is greater than the first fixed percentage.

13. The computer program product of claim 11, further comprising:
selecting a subset of the set of exploitation models based on a fitness function value of each exploitation model of the set of exploitation models, wherein the fitness function value is based both on a corresponding effectiveness ratio and on an alignment with cultural, ethical and individual norms, of each exploitation model;
selecting a subset of the set of exploration models based on a fitness function value of each exploration model of the set of exploration models, wherein the fitness function value is based both on a corresponding effectiveness ratio and on an alignment with cultural, ethical and individual norms, of each exploration model; and
generating the combined exploitation and exploration heat map based on a translation of the first subset and a translation of the second subset to a different data representation that a neural network can understand by interlacing the third subset and the fourth subset.

14. The computer program product of claim 11, further comprising:
selecting a set of crossover strategies from an output of the convoluted neural network by randomly switching a bit of a same location between a chromosome pair of the set of encoded chromosomes; and
updating a qtable for each chromosome of the set of crossover strategies based on user actions and based on norms.

15. The computer program product of claim 11, further comprising:
inputting a user action by collecting data on success and non-success for the user action and relating the user action to a corresponding chromosome of the set of encoded chromosomes.

16. A processor-implemented method for machine learning, the method comprising:
training a set of exploitation models using a first subset of randomly chosen chromosomes of a set of encoded chromosomes, wherein each encoded chromosome of the set of encoded chromosomes comprises a variation of decision step;
evaluating a success or a failure of each chromosome of the first subset of randomly chosen chromosomes;
calculating an effectiveness ratio of each exploitation model of the set of exploitation models by measuring a ratio of successful outcomes compared to all outcomes;
performing the above method steps while simultaneously:
mutating a first fixed percentage of random bits of each chromosome of a second set of randomly chosen chromosomes of the set of encoded chromosomes;
training a set of exploration models using the second set of randomly chosen chromosomes;
evaluating a success or a failure of each chromosome of the second subset of randomly chosen chromosomes; and
calculating an effectiveness ratio of each exploration model of the set of exploration models by measuring a ratio of successful outcomes compared to all outcomes;
generating a combined exploitation and exploration heat map based on a translation of the first subset and a translation of the second subset to a different data representation that a neural network can understand;

inputting the combined exploitation and exploration heat map into a convoluted neural network;

selecting a set of crossover strategies from an output of the convoluted neural network by randomly switching a bit of a same location between a chromosome pair of the set of encoded chromosomes; and updating a qtable for each chromosome of the set of crossover strategies based on user actions and based on norms.

17. The processor-implemented method of claim 16, further comprising:

mutating a second fixed percentage of random bits of each chromosome of the second set of randomly chosen chromosomes of the set of encoded chromosomes, wherein the second fixed percentage is greater than the first fixed percentage.

18. The processor-implemented method of claim 16, further comprising:

selecting a subset of the set of exploitation models based on a fitness function value of each exploitation model of the set of exploitation models, wherein the fitness function value is based both on a corresponding effectiveness ratio and on an alignment with cultural, ethical and individual norms, of each exploitation model;

selecting a subset of the set of exploration models based on a fitness function value of each exploration model of the set of exploration models, wherein the fitness function value is based both on a corresponding effectiveness ratio and on an alignment with cultural, ethical and individual norms, of each exploration model; and generating the combined exploitation and exploration heat map based on a translation of the first subset and a translation of the second subset to a different data representation that a neural network can understand by interlacing the third subset and the fourth subset.

19. The processor-implemented method of claim 16, further comprising:

generating a set of situational strategies from an output of the convoluted neural network which identifies a set of recommended strategy for a corresponding set of different situations.

20. The processor-implemented method of claim 18, further comprising:

updating a qtable for each chromosome of the set of situational strategies based on user actions and based on norms.

* * * * *